UNITED STATES PATENT OFFICE.

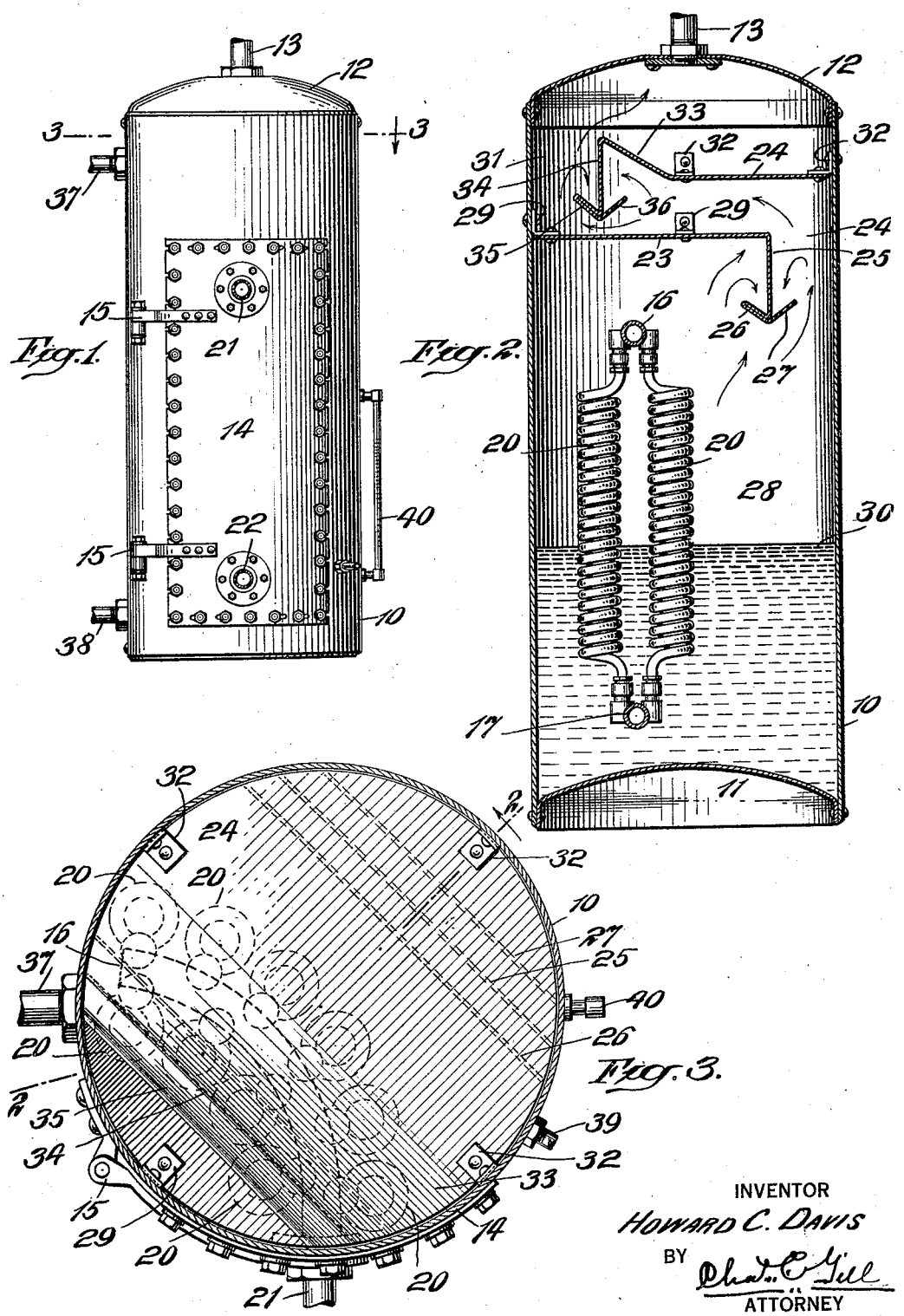

HOWARD C. DAVIS, OF ELIZABETH, NEW JERSEY, ASSIGNOR TO AMERICAN MARINE EQUIPMENT CORPORATION, OF NEW YORK, N. Y., A CORPORATION OF DELAWARE.

EVAPORATOR, FEED WATER HEATER, AND THE LIKE.

1,420,366.

Specification of Letters Patent. Patented June 20, 1922.

Application filed September 19, 1918. Serial No. 254,806.

*To all whom it may concern:*

Be it known that I, HOWARD C. DAVIS, a citizen of the United States, and a resident of Elizabeth, in the county of Union and State of New Jersey, have invented certain new and useful Improvements in Evaporators, Feed-Water Heaters, and the like, of which the following is a specification.

The invention pertains more particularly to evaporators for providing pure distilled water for feeding boilers, drinking and other purposes, and one object of the invention is to provide an evaporator which shall be highly efficient in use and capable of being conveniently constructed. One of the main purposes of the invention is to provide within the evaporator shell, baffles of novel construction and arrangement and capable of efficient use in removing any entrained moisture from the vapor as it arises within the evaporator shell. In the employment of the evaporator, the vapor arises above the body of water and passes to the vapor-outlet and with the vapor spray arises and moisture becomes entrained in the vapor, and the purpose of my invention is to arrest the spray and entrained moisture and return the same to the body of liquid within the evaporator.

The invention will be fully understood from the detailed description hereinafter presented, reference being had to the accompanying drawings, in which:

Fig. 1 is a side elevation of an evaporator constructed in accordance with and embodying the invention;

Fig. 2 is a vertical section, on a larger scale, of the same, taken on the dotted line 2—2 of Fig. 3, and Fig. 3 is a horizontal section through the same, taken on the dotted line 3—3 of Fig. 1.

In the drawings, 10 designates a vertical metallic cylinder or shell having a bottom 11 and a convex or dome head 12 equipped with an outlet pipe 13 for the vapor. The shell 10 has a vertical door-way or opening in its side and is equipped with a door 14 for closing said door-way. The door 14 is secured by hinges 15 to the shell, one member of each hinge being securely riveted to the shell and the other member of each hinge to the door, as it will be understood on reference to Figs. 1 and 3. The door 14 is of segmental outline so that when in closed position it may constitute a continuation of the general walls of the shell or cylinder. Upon the upper and lower inner portions of the door 14 are secured manifolds or headers 16, 17, respectively, which correspond with each other and are segmental or of arcuate form in length and extend, when the door 14 is in closed position from about the vertical center of the door laterally on curved lines toward one side of the cylinder 10, as indicated by dotted lines in Fig. 3. The manifolds 16, 17 are connected by and in communication with vertical helical coils 20, and said coils define segmental outlines corresponding with those of the manifolds. The manifold or header 16 is in connection at the outer side of the door 14 with an inlet pipe 21, and the manifold or header 17 is at the outer side of the door in communication with an outlet or discharge pipe or condensation drain 22.

In the construction shown the hinged door 14 carries the manifolds and coils so that upon the opening of the door the manifolds and coils may become withdrawn and exposed for any attention they may require, and that when the door is in closed position, the manifolds and coils may become so disposed that a commodious chamber is secured at one side of the body or bank of coils and a chamber much less in size is formed at the other side of the body or bank of coils. An evaporator having the hinged door 14, manifolds 16, 17 of arcuate outline and coils 20, is shown and claimed in an application for Letters Patent filed by Reuben R. Row and Howard C. Davis on March 14, 1917, Serial No. 154,672, and therefore these features of construction and arrangement are not claimed herein, nor is this application limited to the special manifolds and coils disclosed herein or in the aforesaid application.

The present invention pertains more particularly to the baffle plates and their connections disposed within the upper end of the cylinder 10 above the manifolds and coils and below the outlet pipe 13 for the vapor. I make use of two baffle plates, one numbered 23 and the other 24. The plate 23 is of general segmental outline in its body portion and extends above the coils 20 between all of the inner walls of the cylinder 10, with the exception of a throat space 24', for the upward passage of vapor and at which the plate 23 has a downwardly extending portion 25, which may be integral therewith, at whose lower end is formed two transverse V-troughs 26, 27, respectively, which may also be integral with said portion 25 and bent up from the sheet metal of which the plate 23, with its portion 25, is formed. The transverse troughs 26, 27 are above that side of the chamber of the cylinder 10 affording the commodious chamber 28 at one side of the bank of coils 20, as indicated in Figs. 2 and 3. The plate 23 may be secured to the inner walls of the cylinder 10 by means of suitable brackets 29, and I provide a small space between the edges of said plate, with the troughs 26, 27, and the inner walls of the cylinder 10, so that water gathering on the plate 23 and within said troughs may drain from the edges of the plate and the ends of the troughs against the inner walls of the cylinder 10 and descend down said walls to the body of liquid contained within said cylinder. The space between the inner walls of the cylinder 10 and the plate 23 and ends of the troughs 26, 27 may be restricted or narrow in width, as denoted in Fig. 3.

The baffle plate 24 extends inwardly above and in a reverse direction to that of the baffle plate 23 and it crosses the interior chamber of the cylinder 10 with the exception of leaving a throat-space 31 for the passage of vapor to the outlet pipe 13. The throat 31 is at one side of the chamber of the cylinder 10 and the throat 24' is at the opposite side of said chamber, and the baffle plate 24 is conveniently spaced above the baffle plate 23 and may be secured to the inner walls of the cylinder 10 by means of suitable angle iron brackets 32. The plate 24 is bent upwardly at its inner edge, as at 33, and then downwardly, as at 34, and at the lower edge of the portion 34 are two troughs 35, 36 corresponding with the aforesaid troughs 26, 27. The baffle plate 24 is so proportioned with respect to the cylinder 10 that a limited space is left between the edges of said plate, with its troughs 35, 36 and the inner walls of said cylinder 10, so that moisture gathering on said plate and in said troughs may flow down the walls of said cylinder. The baffle plate 24 corresponds with the baffle plate 23, with the exception of having the upwardly inclined portion 33, and is reversely disposed with respect to the baffle plate 23 so that the throat 24' may be at one side of the chamber of the cylinder 10 and the throat 31 at the opposite side of said chamber.

The shell 10 will be equipped with the usual or any suitable pipe and other connections, such as the vapor outlet pipe 13, connection 37 for the safety valve, connection 38 for a blow-off valve, pipe 39 serving to feed water to the shell 10, and water-gauge 40.

In the employment of the apparatus as an evaporator, the water is fed within the shell 10 and submerges the lower portions of the coils 20, and steam is admitted to the manifold 16, whence it passes downwardly through all of the coils 20, and the drain is through the manifold or header 17.

The action of the heated coils 20 on the water 30 is commonly understood, vaporizing the water, with the vapor passing off through the pipe 13 to a condenser or elsewhere, as may be desired, but in the use of my invention highly efficient results are attained in that the entrained moisture passing upwardly with the vapor and the spray are arrested and returned to the body of water 30, so that only the vapor passes off through the pipe 13. The lower baffle 23 arrests the main body of the spray and entrained moisture and the water or moisture which gathers on the lower side of the baffle plate 23 will either pass to the edges of said plate and descend down the inner walls of the cylinder 10, or pass down to the trough 26 and be by it directed to the sides of the shell where it will drain back down the inner walls of the shell and thus reach the body of liquid 30 without being again picked up by the ascending vapor. The vapor striking the lower side of the baffle plate 23 returns under the troughs 26, 27 and ascends through the throat space 24', and the vapor which ascends directly through said throat space 24' without striking the body of the baffle plate 23, will have a percentage of entrained moisture and become mixed with the main body of vapor already freed of its moisture by the baffle plate 23, and the vapor thus passing up through the throat space 24' will almost immediately come into contact with the upper baffle plate 24, which will arrest the entrained moisture and cause the same either to flow from the edges of said plate 24 down the inner side walls of the shell or cylinder 10 or pass into the trough 36, which will direct said moisture to said walls of said shell or cylinder, the vapor reaching the plate 24 being compelled to turn laterally and moving partly against the vertical member 34 of said plate and then downwardly around the trough 36. Any moisture which may be carried laterally beyond the vertical member 34 of the plate 24 may fall into the trough 35 and be thereby directed to the inner walls of the cylinder 10. Entrained moisture which may pass into the throat space 24' may fall into the trough 27 and be thereby directed to the inner walls of the cylinder 10, and in addition any water or moisture passing down the outer side of the vertical member 25 of the baffle 23 may enter said trough 27. The inclined portion 33 of the baffle-plate 24 may cause any moisture or liquid arrested upon it to flow down upon the main body of the baffle 24 so that the same may escape down along the inner walls of the cylinder 10. The baffles 23, 24 have been specially designed to improve the quality of the vapor and the product derived therefrom by efficiently removing from the vapor any entrained moisture not properly vaporized arising from the body of liquid 30, and in practical use the value of the baffles 23, 24 arranged and constructed as described has been fully demonstrated. Among the important features of the baffles 23, 24, it may be mentioned that the troughs at the outer edges of said baffles, adjacent to the throat spaces, are of particular value in that they carry the moisture to the side wall of the shell, thus avoiding exposed edges from which the moisture could drop into the vapor steam line. I have found in use that the moisture gathering on the bottoms of the plates 23, 24 will pass to the edges of said plates and then down the inner walls of the cylinder or shell 10 or to the troughs connected with said plates and be by them directed to said walls.

I do not limit my invention to any special arrangement of evaporator coils within the shell or cylinder 10, since my invention more particularly pertains to the baffles arranged above said coils to arrest the spray and entrained moisture and return the same, out of the main steam line, to the body of liquid 30 within the lower portion of the shell or cylinder 10. I illustrate each baffle 23, 24 as made in one piece of sheet metal, but I do not limit my invention to this manner of constructing the baffles, since they may be made in separate pieces fastened together, nor do I in every instance limit the invention to the duplex troughs or plurality of troughs at the outer edge of each baffle, since the inner trough at the outer edge of each baffle performs a very important function. I prefer, however, to employ the two troughs at the outer edge of each baffle in the interest of securing the highest efficiency or best result.

What I claim as my invention and desire to secure by Letters Patent, is:

1. In apparatus of the character described comprising a casing, steam heating means therein and connections therefor, said casing being adapted to contain a liquid partly submerging said steam heating means, a solid baffle plate within said casing covering said heating means from above and extending transversely nearly across the diameter of the casing and having at its free edge a downwardly extending member at whose inner edge is a trough for receiving particles of water from the lower side of said plate and directing the same to the inner wall of the casing, a throat space for ascending vapor being formed between said downwardly extending member and the adjacent side of said casing.

2. In apparatus of the character described comprising a casing, steam heating means therein and connections therefor, said casing being adapted to contain a liquid partly submerging said steam heating means, a solid baffle plate within said casing covering said heating means from above and extending transversely nearly across the diameter of the casing and having at its free edge a downwardly extending member at whose lower edge are opposite troughs for receiving particles of water from the upper and lower sides of said plate and directing the same to the inner wall of the casing, a throat space for ascending vapor being formed between said downwardly extending member and the adjacent side of said casing.

3. In apparatus of the character described comprising a casing, steam heating means therein and connections therefor, said casing being adapted to contain a liquid partly submerging said steam heating means, a solid baffle plate within said casing covering said heating means from above and extending transversely nearly across the diameter of the casing and having at its free edge a downwardly extending member at whose inner edge is a trough for receiving particles of water from the lower side of said plate and directing the same to the inner wall of the casing, said baffle plate at its peripheral edges being supported by and spaced from the inner wall of said casing, thereby leaving a narrow space around said edges down through which water gathered on the upper side of the plate may pass to and flow down the inner wall of the casing, and an open throat space for ascending vapor being formed between said downwardly extending member and the adjacent side of said casing.

4. In apparatus of the character described, comprising a casing, steam heating means therein and connections therefor, said casing being adapted to contain a liquid partly submerging said steam heating means, a solid baffle plate within said casing covering said heating means from above and extending transversely nearly across the diameter of the casing and having at the inner side of its free edge a trough for receiving particles of water from the lower side of said plate and directing the same to the inner wall of the casing, said plate also being supported by and spaced from said wall of said casing, thereby leaving a narrow space through which water arrested on top of said plate may reach and flow down said inner wall, and an open throat space for ascending vapor being formed between said free edge of the baffle and the adjacent side of said casing.

5. In apparatus of the character described, comprising a casing, heating means therein and connections therefor, said casing being adapted to contain a liquid partly submerging said heating means, solid baffle plates, one above the other within said casing and covering said heating means from above and extending transversely in opposing directions nearly across the diameter of the casing, thereby leaving unaligned contracted throats for ascending vapor between the free edges of said plates and the adjacent sides of the casing, said plates having at their free edges inner and outer troughs for receiving particles of water and directing the same to the inner wall of the casing.

6. In apparatus of the character described, comprising a casing, steam heating means therein and connections therefor, said casing being adapted to contain a liquid partly submerging said steam heating means, solid baffle plates, one above the other within said casing and covering said heating means from above and extending transversely in opposing directions nearly across the diameter of the casing, thereby leaving unaligned contracted throats for ascending vapor between the free edges of said plates and the adjacent sides of the casing, and said plates having at their free edges downwardly extending members provided at the inner side of their lower edges with troughs for receiving particles of water from the lower sides of said plates and directing the same to the inner wall of the casing.

7. In apparatus of the character described, comprising a casing, steam heating means therein and connections therefor, said casing being adapted to contain a liquid partly submerging said steam heating means, solid baffle plates, one above the other within said casing and covering said heating means from above and extending transversely in opposing directions nearly across the diameter of the casing, thereby leaving unaligned contracted throats for ascending vapor between the free edges of said plates and the adjacent sides of the casing, and said plates having at their free edges downwardly extending members provided at their lower edges with inner and outer troughs for receiving particles of water and directing the same to the inner wall of the casing, and said plates being supported by and spaced at their peripheral edges from the inner wall of the casing so as to leave a limited space at the said edges through which water gathered on the plates may pass to and down the wall of the casing.

8. In apparatus of the character described, comprising a casing, steam heating means therein and connections therefor, said casing being adapted to contain a liquid partly submerging said steam heating means, solid baffle plates one above the other within said casing and covering said heating means from above and extending transversely in opposing directions nearly across the diameter of the casing, thereby leaving unaligned contracted throats for ascending vapor between the free edges of said plates and the adjacent sides of the said casing, the lower plate having at its free edge inner and outer troughs for receiving particles of water and directing the same to the inner wall of the casing, and the upper plate being at its free edge portion inclined upwardly and then extended downwardly and having at the lower edge of its downwardly extending portion inner and outer troughs for receiving particles of the water and directing the same to the inner wall of the casing.

9. In apparatus of the character described, comprising a casing, steam heating means therein and connections therefor, said casing being adapted to contain a liquid partly submerging said steam heating means, solid baffle plates, one above the other, within said casing and covering said heating means from above and extending transversely in opposing directions nearly across the diameter of the casing, thereby leaving unaligned contracted throats for ascending vapor between the free edges of said plates and the adjacent sides of said casing, the lower plate having at its free edge a downwardly extending portion provided with inner and outer troughs for receiving particles of water and directing the same to the inner wall of the casing, and the upper plate being at its free edge portion inclined upwardly and then extended downwardly and having at the lower edge of its downwardly extended portion inner and outer troughs for receiving particles of water and directing the same to the inner wall of the casing, and both of said plates being supported by and spaced from said wall of said casing, thereby leaving a narrow space through which the water arrested on the top of said plates may reach and flow down said inner wall.

Signed at New York city, in the county of New York, and State of New York, this 11th day of September, A. D. 1918.

HOWARD C. DAVIS.

Witnesses:
J. R. FRITH,
CHAS. C. GILL.